US008223513B2

(12) United States Patent
Zhao et al.

(10) Patent No.: US 8,223,513 B2
(45) Date of Patent: Jul. 17, 2012

(54) INVERTER FOR A LIQUID CRYSTAL DISPLAY DEVICE WITH SOFT START CIRCUIT TO OVERCOME POWER LOSS IN TRANSISTOR SWITCHING

(75) Inventors: Li-Jun Zhao, Shenzhen (CN); Tong Zhou, Shenzhen (CN)

(73) Assignees: Innocom Technology (Shenzhen) Co., Ltd., Shenzhen, Guangdong Province (CN); Chimei InnoLux Corporation, Miaoli County (TW)

( * ) Notice: Subject to any disclaimer, the term of this patent is extended or adjusted under 35 U.S.C. 154(b) by 366 days.

(21) Appl. No.: 12/387,499

(22) Filed: May 4, 2009

(65) Prior Publication Data

US 2009/0273953 A1 Nov. 5, 2009

(30) Foreign Application Priority Data

May 2, 2008 (TW) ................................ 97116300 A

(51) Int. Cl.
*H02M 1/00* (2007.01)
*H02M 3/335* (2006.01)

(52) U.S. Cl. ........................................ 363/49; 363/21.02

(58) Field of Classification Search .................. 323/901; 363/21.02, 21.03, 49

See application file for complete search history.

(56) References Cited

U.S. PATENT DOCUMENTS

| | | | | |
|---|---|---|---|---|
| 5,021,716 | A | 6/1991 | Lesea | |
| 5,576,943 | A | 11/1996 | Keir | |
| 5,642,065 | A * | 6/1997 | Choi et al. | 327/110 |
| 6,671,193 | B1 | 12/2003 | Pelkonen | |
| 6,760,233 | B2 * | 7/2004 | Tolle et al. | 363/16 |
| 6,950,318 | B2 * | 9/2005 | Liang et al. | 363/16 |
| 2005/0041439 | A1 * | 2/2005 | Jang et al. | 363/17 |
| 2006/0091871 | A1 * | 5/2006 | Abedinpour et al. | 323/283 |
| 2010/0020569 | A1 * | 1/2010 | Melanson et al. | 363/21.03 |

* cited by examiner

*Primary Examiner* — Adolf Berhane
*Assistant Examiner* — Emily Pham
(74) *Attorney, Agent, or Firm* — Li & Cai Intellectual Property (USA) Office

(57) ABSTRACT

An inverter includes a pulse width modulation (PWM) circuit, a direct current (DC) voltage input terminal, a storage capacitor, a first transformer, a soft start circuit, and a first transistor. The PWM circuit includes a first output terminal. The first transformer includes a first primary winding. The first primary winding includes a first terminal and a second terminal capable of being grounded via the storage capacitor. The soft start circuit includes an inductor and a first capacitor. A gate electrode of the first transistor is connected to the first output terminal. A source electrode of the first transistor is connected to the first terminal of the first transformer via the inductor. A drain electrode of the first transistor is connected to the DC voltage input terminal and connected to the source electrode via the capacitor.

17 Claims, 3 Drawing Sheets

INVERTER FOR A LIQUID CRYSTAL DISPLAY DEVICE WITH SOFT START CIRCUIT TO OVERCOME POWER LOSS IN TRANSISTOR SWITCHING

CROSS-REFERENCE TO RELATED APPLICATION

This application is related to, and claims the benefit of, a foreign priority application filed in Taiwan as Ser. No. 097116300 on May 2, 2008. The related application is incorporated herein by reference.

BACKGROUND

1. Technical Field

The present disclosure relates to an inverter for a liquid crystal display (LCD) device.

2. Description of Related Art

LCD devices provide portability, low power consumption, and low radiation, and find wide use in various portable information devices such as notebooks, personal digital assistants (PDAs), video cameras and others. A typical LCD device includes an LCD panel, one or more backlights illuminating the LCD panel, and an inverter driving the backlights.

FIG. 3 shows a circuit diagram of a commonly used inverter. The inverter 10 includes a pulse width modulation (PWM) circuit 11, a first transistor 13, a second transistor 12, a direct current (DC) voltage input terminal 14, a first transformer 15, and a second transformer 16. The PWM circuit 11 includes a first output terminal 112 and a second output terminal 111. The first transformer 15 includes a first primary winding 151 and a first secondary winding 152. The first primary winding 151 includes a first terminal 1511 and a second terminal 1512. The second transformer 16 includes a second primary winding 161 and a second secondary winding 162. The second secondary winding 162 includes a third terminal 1611 and a fourth terminal 1612. The DC voltage input terminal 14 receives a fourteen volt (14V) DC voltage.

A gate electrode (not labeled) of the second transistor 12 is connected to the second output terminal 111 of the PWM circuit 11 via a resistor. A source electrode (not labeled) of the second transistor 12 is grounded. A drain electrode (not labeled) of the second transistor 12 is connected to a source electrode (not labeled) of the first transistor 13. A gate electrode (not labeled) of the first transistor 13 is connected to the first output terminal 112 via a resistor. A drain electrode (not labeled) of the first transistor 13 is connected to the DC voltage input terminal 14.

The first terminal 1511 of the first primary winding 151 is connected to the drain electrode of the second transistor 12. The second terminal 1512 of the first primary winding 151 is connected to the DC voltage input terminal 14 via a capacitor, and grounded via a storage capacitor 17. Two terminals (not labeled) of the first secondary winding 152 are connected to two lamps (not labeled), respectively. The third terminal 1611 of the second primary winding 161 is connected to the first terminal 1511 of the first primary winding 151. The fourth terminal 1612 of the second primary winding 161 is connected to the second terminal 1512 of the second primary winding 151. Two terminals (not labeled) of the second secondary winding 162 are connected to other two lamps (not labeled), respectively. The four lamps provide a light source for the LCD device.

When the inverter 10 is operational, the PWM circuit 11 alternates between outputting control signals to the gate electrode of the second transistor 12 and to the gate electrode of the first transistor 13, and the second transistor 12 and the first transistor 13 are switched on in turn.

When the second transistor 12 is switched off and the first transistor 13 is switched on, the 14V DC voltage charges the storage capacitor 17 via the first transistor 13 and the first primary winding 151 in turn. Simultaneously, the 14V DC voltage charges the storage capacitor 17 via the first transistor 13 and the second primary winding 161 in turn.

When the second transistor 12 is switched on and the first transistor 13 is switched off, the storage capacitor 17 discharges via the first primary winding 151 and the second transistor 12. Simultaneously, the storage capacitor 17 discharges via the second primary winding 161 and the second transistor 12.

However, when the first transistor 13 is switched on, current through the drain electrode and the source electrode of the first transistor 13 increases gradually, as voltage between the two electrodes decreases gradually, necessitating an overlap between the current and the voltage. Therefore, a high wattage loss of the first transistor 13 is generated when the first transistor 13 is switched on.

What is needed, therefore, is an inverter which can overcome the described limitations.

DETAILED DESCRIPTION

Reference will now be made to the drawings to describe preferred and exemplary embodiments of the invention in detail.

Figure 1:
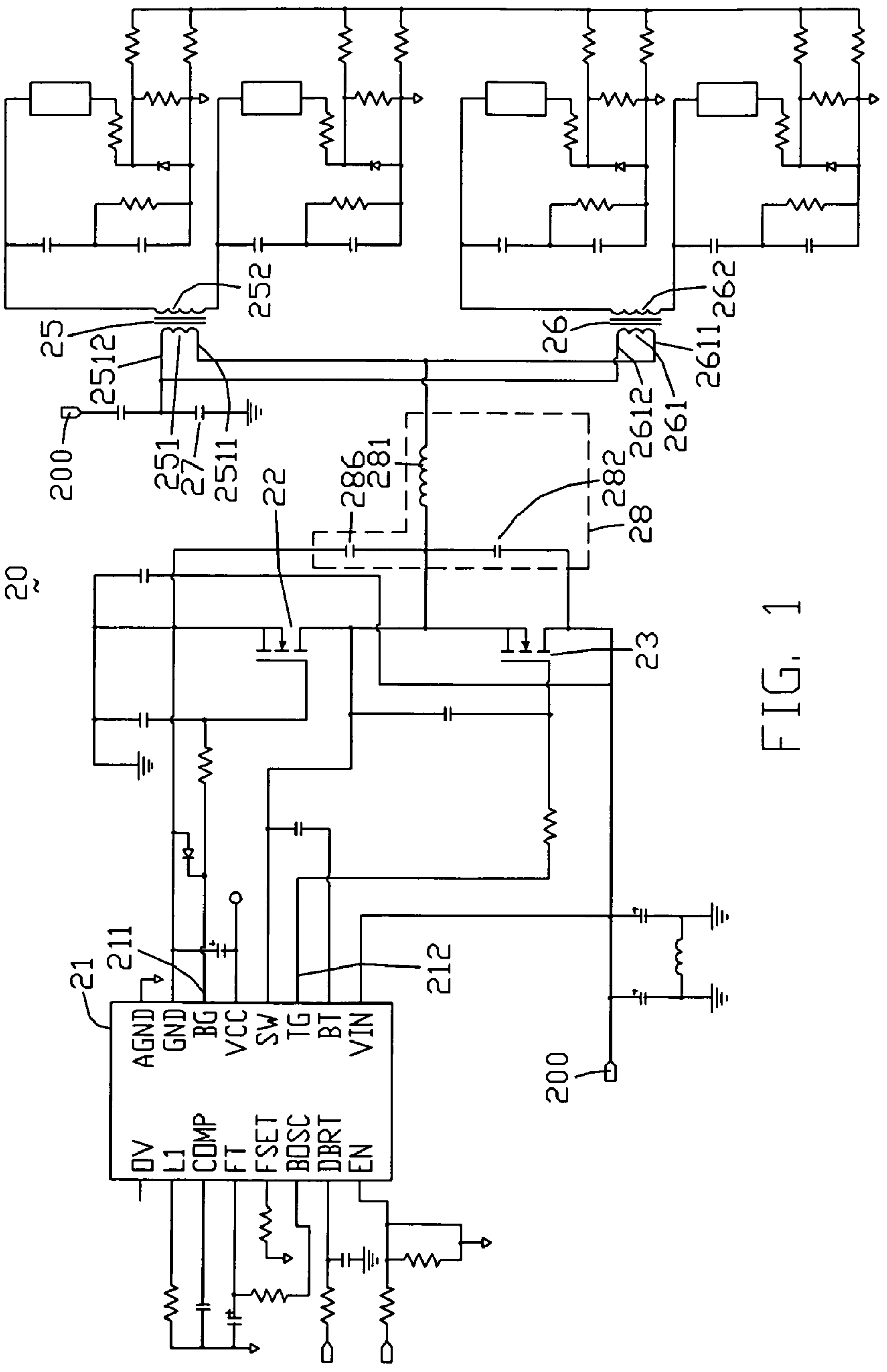
FIG. 1 is a circuit diagram of a first embodiment of an inverter according to the disclosure.

FIG. 1 is a circuit diagram of a first embodiment of an inverter according to the disclosure. The inverter 20 includes a PWM circuit 21, a first transistor 23, a second transistor 22, a DC voltage input terminal 200, a first transformer 25, a second transformer 26, and a soft start circuit 28.

The PWM circuit 21 includes a first output terminal 212 and a second output terminal 211. The first transformer 25 includes a first primary winding 251 and a first secondary winding 252. The first primary winding 251 includes a first terminal 2511 and a second terminal 2512. The second transformer 26 includes a second primary winding 261 and a second secondary winding 262. The second primary winding 261 includes a third terminal 2611 and a fourth terminal 2612. The soft start circuit 28 includes an inductor 281 and a first capacitor 282. An inductance of the inductor 281 can be one nanohenry (1 nH). A capacitance of the first capacitor 282 can be ten nanofarad (10 nF).

The DC voltage input terminal 200 receives a 14V DC voltage. A gate electrode (not labeled) of the second transistor 22 is connected to a second output terminal 211 of the PWM circuit 21 via a resistor. A source electrode (not labeled) of the second transistor 22 is grounded. A drain electrode (not labeled) of the second transistor 22 is connected to a source electrode (not labeled) of the first transistor 23, and connected to the DC voltage input terminal 200 via the first capacitor 282. A gate electrode (not labeled) of the first transistor 23 is connected to the first output terminal 212 of the PWM circuit 21 via a resistor. A drain electrode (not labeled) of the first transistor 23 is connected to the DC voltage input terminal 200.

The first terminal 2511 of the first primary winding 251 is connected to the drain electrode of the second transistor 22 via the inductor 281. The second terminal 2512 of the first primary winding 251 is grounded via a storage capacitor 27. Two terminals (not labeled) of the first secondary winding 252 are connected to two lamps (not labeled), respectively.

The third terminal 2611 of the second primary winding 261 is connected to the first terminal 2511 of the first primary winding 251. The fourth terminal 2612 of the second primary winding 261 is connected to the second terminal 2512 of the first primary winding 251. Two terminals (not labeled) of the second secondary winding 262 are connected to other two lamps (not labeled), respectively. The four lamps provide a light source for an LCD device.

The inductor 281 and the first capacitor 282 form a series resonant circuit. When the inverter 20 is in operation, a voltage of the first capacitor 282 shows a sinusoidal variation. When the voltage of the first capacitor 282 equals zero (0V), the PWM circuit 21 outputs a control signal to the gate electrode of the first transistor 23. Thus, the first transistor 23 is switched on when the voltage of the first capacitor 282 is 0V. Besides, the PWM circuit 21 alternates in outputting control signals to the gate electrode of the second transistor 22 and the gate electrode of the first transistor 23. The second transistor 22 and the first transistor 23 are switched on in turn.

When the second transistor 22 is switched off and the first transistor 23 is switched on, the 14V DC voltage charges the storage capacitor 27 via the first transistor 23, the inductor 281, and the first primary winding 251 in turn. Simultaneously, the 14V DC voltage charges the storage capacitor 27 via the first transistor 23, the inductor 281, and the second primary winding 261 in turn.

When the second transistor 22 is switched on and the first transistor 23 is switched off, the storage capacitor 27 discharges via the first primary winding 251, the inductor 281, and the second transistor 22. Simultaneously, the storage capacitor 27 discharges via the second primary winding 261, the inductor 281 and the second transistor 22.

The first transistor 23 is switched on when the voltage of the first capacitor 282 is 0V. Thus, the first transistor 23 is switched on when a voltage between the source and drain electrodes of the first transistor 23 is 0V. An overlap between a current and the voltage between the source and drain electrodes of the first transistor 23 is avoided when the first transistor 23 is switched on. Therefore, wattage loss of the first transistor 23 is comparatively reduced when the first transistor 23 is switched on.

The soft start circuit 28 can further include a second capacitor 286 connected between the source and drain electrodes of the second transistor 22. In a similar way, wattage loss of the second transistor 22 can be comparatively reduced when the second transistor 22 is switched on.

Figure 2:
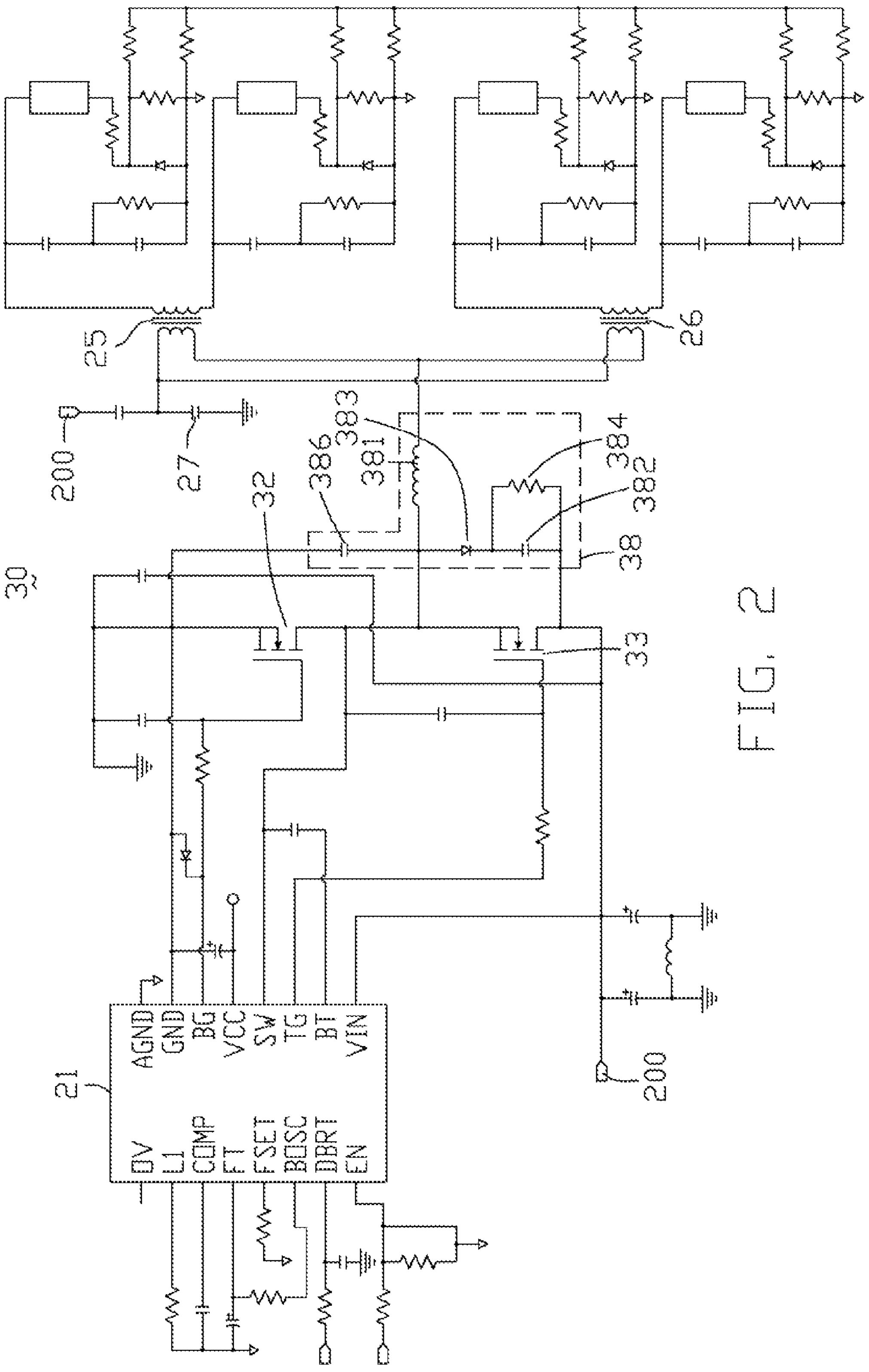
FIG. 2 is a circuit diagram of a second embodiment of an inverter according to the disclosure.
Figure 3:
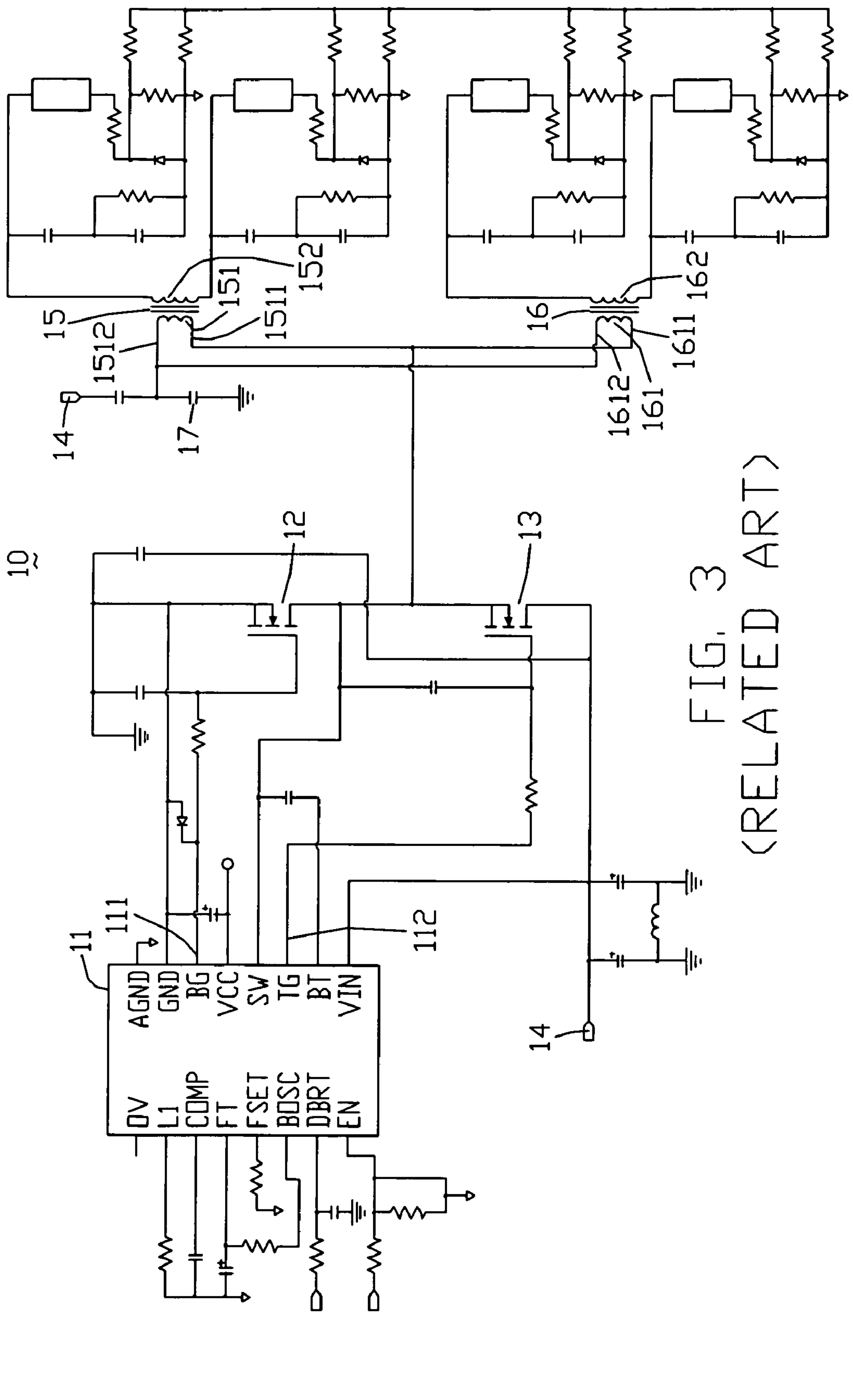
FIG. 3 (RELATED ART)
FIG. 3 is a circuit diagram of a commonly used inverter.

FIG. 2 shows a circuit diagram of a second embodiment of an inverter according to the disclosure, differing from inverter 20 of the previous embodiment, only in that a soft start circuit 38 further includes a diode 383 and a resistor 384. An anode (not labeled) of the diode 383 is connected to a source electrode (not labeled) of a first transistor 33. A cathode (not labeled) of the diode 383 is connected to a drain electrode (not labeled) of a first transistor 33 via a first capacitor 382. The resistor 384 is connected in parallel with the first capacitor 382. After the first transistor 33 is switched on, the first capacitor 382 discharges via the resistor 384. The diode 383 prevents current discharged by the first capacitor 382 from flowing through an inductor 381.

The soft start circuit 38 can further include a second capacitor 386 connected between a source and a drain electrodes of the second transistor 32. In a similar way, wattage loss of the second transistor 32 can be comparatively reduced when the second transistor 32 is switched on.

In alternative embodiments, the inverter 20, 30 can be used in other electric equipment which needs an alternating current (AC) voltage power supply.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of arrangement of parts) within the principles of the disclosure to the full extent indicated by the broad general meaning of the terms in which the appended claims are expressed.

What is claimed is:

1. An inverter comprising:

a pulse width modulation (PWM) circuit comprising a first output terminal;

a direct current (DC) voltage input terminal;

a storage capacitor;

a first transformer comprising:

a first primary winding comprising a first terminal and a second terminal capable of being grounded via the storage capacitor;

a soft start circuit comprising an inductor and a first capacitor;

a first transistor, a gate electrode of the first transistor connected to the first output terminal, a source electrode of the first transistor connected to the first terminal of the first transformer via the inductor, a drain electrode of the first transistor connected to the DC voltage input terminal and connected to the source electrode of the first transistor via the first capacitor;

wherein the inverter further comprises a second transistor, the PWM circuit further comprises a second output terminal, a gate electrode of the second transistor is connected to the second output terminal, a source electrode of the second transistor is grounded, and a drain electrode of the second transistor is connected to the source electrode of the first transistor;

wherein the soft start circuit further comprises a diode and a resistor, an anode of the diode is connected to the source electrode of the first transistor, a cathode of the diode is connected to the drain electrode of the first transistor via the first capacitor, and the resistor is connected in parallel with the first capacitor.

2. The inverter of claim 1, wherein the inductor and the first capacitor form a series resonant circuit.

3. The inverter of claim 1, wherein a variation of a voltage between the source and drain electrodes of the first transistor is sinusoidal before the first transistor is switched on.

4. The inverter of claim 3, wherein when a voltage between the source and drain electrodes of the first transistor equals zero (0V), the first transistor is switched on.

5. The inverter of claim 3, wherein the second terminal of the first primary is further connected to the DC voltage input terminal via a capacitor.

6. The inverter of claim 1, further comprising a second transformer comprising a second primary winding, the second primary winding comprising a third terminal and a fourth terminal, the third terminal connected to the first terminal of the first primary winding, and the fourth terminal connected to the second terminal of the first primary winding.

7. The inverter of claim 1, wherein the gate electrode of the first transistor is connected to the first output terminal via a resistor.

8. The inverter of claim 1, wherein the soft start circuit further comprises a second capacitor, one terminal of the second capacitor is connected to the source electrode of the second transistor, and the other terminal of the second capacitor is connected to the drain electrode of the second transistor.

9. The inverter of claim 1, wherein the gate electrode of the second transistor is connected to the second output terminal via a resistor.

10. The inverter of claim 1, wherein the soft start circuit further comprises a second capacitor, one terminal of the second capacitor is connected to the source electrode of the second transistor and the other terminal of the second capacitor is connected to the drain electrode of the second transistor.

11. An inverter comprising:

a pulse width modulation (PWM) circuit comprising a first output terminal;

a direct current (DC) voltage input terminal;

a storage capacitor;

a first transformer comprising:

a first primary winding comprising a first terminal and a second terminal capable of being grounded via the storage capacitor;

a soft start circuit comprising an inductor and a first capacitor;

a first transistor, a gate electrode of the first transistor connected to the first output terminal, a source electrode of the first transistor connected to the first terminal of the first transformer via the inductor, a drain electrode of the first transistor connected to the DC voltage input terminal and connected to the source electrode of the first transistor via the first capacitor;

wherein the soft start circuit further comprises a diode and a resistor, an anode of the diode is connected to the source electrode of the first transistor, a cathode of the diode is connected to the drain electrode of the first transistor via the first capacitor, and the resistor is connected in parallel with the first capacitor.

12. The inverter of claim 11, wherein the soft start circuit further comprises a second capacitor, one terminal of the second capacitor is connected to the source electrode of the second transistor, and the other terminal of the second capacitor is connected to the drain electrode of the second transistor.

13. An inverter, comprising:

a first transistor;

a pulse width modulation (PWM) circuit operable to switch the first transistor on or off;

a first transformer comprising a first primary winding;

a direct current (DC) voltage input terminal receiving a DC voltage, and outputting the DC voltage to the first primary winding via the first transistor;

a soft start circuit disposed between the first transistor and the first primary winding, and controlling a variation of a voltage between a source and a drain electrodes of the first transistor is sinusoidal before the first transistor is switched on; and a storage capacitor and a second transistor, wherein the soft start circuit comprises an inductor and a first capacitor connected between a source electrode of the first transistor and a drain electrode of the first transistor, when the first transistor is switched on and the second transistor is switched off, the DC voltage charges the storage capacitor via the first transistor, the inductor, and the first primary winding; and when the first transistor is switched off and the second transistor is switched on, the storage capacitor discharges via the first primary winding, the inductor and the second transistor.

14. The inverter of claim 13, wherein the soft start circuit further comprises a diode and a resistor, an anode of the diode is connected to the source electrode of the first transistor, a cathode of the diode is connected to the drain electrode of the first transistor via the first capacitor, and the resistor is connected in parallel with the first capacitor.

15. The inverter of claim 13, wherein the soft start circuit further comprises a second capacitor connected between a source electrode of the second transistor and a drain electrode of the second transistor.

16. The inverter of claim 13, wherein when a voltage between the source and drain electrodes of the first transistor equals zero (0V), the first transistor is switched on.

17. The inverter of claim 13, wherein the PWM circuit is further operable to switch the second transistor on or off.

* * * * *